United States Patent [19]

Kijima et al.

[11] Patent Number: 4,906,018
[45] Date of Patent: Mar. 6, 1990

[54] VEHICLE SUSPENSION SYSTEM

[75] Inventors: Takao Kijima; Takeshi Edahiro; Takashi Hirochika, all of Hiroshima, Japan

[73] Assignee: Mazda Motor Manufacturing, Hiroshima, Japan

[21] Appl. No.: 231,210

[22] Filed: Aug. 11, 1988

[30] Foreign Application Priority Data

Aug. 17, 1987 [JP] Japan .................................. 62-204560

[51] Int. Cl.4 .............................................. B60D 21/00
[52] U.S. Cl. ...................................... 280/690; 280/781
[58] Field of Search ............... 280/666, 701, 724, 690, 280/696, 688, 716, 781, 788

[56] References Cited

U.S. PATENT DOCUMENTS

| | | | |
|---|---|---|---|
| 4,456,282 | 6/1984 | Rumpel | 280/690 |
| 4,615,539 | 10/1986 | Pierce | 280/690 |
| 4,671,531 | 6/1987 | Sautter et al. | 280/690 |
| 4,714,132 | 12/1987 | Hattori et al. | 280/716 X |
| 4,746,146 | 5/1988 | Hirabayashi et al. | 280/724 X |

Primary Examiner—Charles A. Marmor
Assistant Examiner—Michael Mar
Attorney, Agent, or Firm—Wenderoth, Lind & Ponack

[57] ABSTRACT

The present invention is drawn to a structure for supporting suspension arms connected with a wheel supporting member on a vehicle body having a main frame and a side sill, which extend in the longitudinal direction of the vehicle body side by side. The structure includes a bracket which pivotally supports a swing arm on the main frame and the side sill, whereby load on the swing arm is distributed to the main frame and the side sill. And, the rigidity of the vehicle body is improved by the connection of the main frame to the side sill with the bracket.

14 Claims, 3 Drawing Sheets

VEHICLE SUSPENSION SYSTEM

BACKGROUND OF THE INVENTION

1. Field of the Invention

The present invention relates to a vehicle suspension system.

2. Description of the Prior Art

The following arrangement is known as a vehicle suspension system, namely, an upper control arm and two lower control arms arranged in the widthwise direction of a vehicle body are connected with a wheel support member, each of the control arms is supported on a sub-frame connected elastically with the vehicle body and a vertical arm disposed in the longitudinal direction of the vehicle body is connected with the wheel support member to be supported directly by the vehicle body (refer to U.S. Pat. No. 4,671,531).

With the above arrangement, a toe-in replacement is controlled by utilizing the two lower control arms and a camber displacement is controlled by utilizing the upper control arm. Also, it is possible to allot the force in the longitudinal direction of the vehicle body to the vertical arm. Since the vertical arm is supported directly by the vehicle body, the above-mentioned force in the longitudinal direction does not work on the sub-frame and therefore this force does not affect much the control arms, in other words, a good control can be made on wheels.

In the case where a suspension arm, such as the vertical arm mentioned above, is supported on the vehicle body, a main frame extending in the longitudinal direction of the vehicle body and having high rigidity is considered as a supporting position. However, since the main frame is subjected to high load due to its supporting the vertical arm, a special reinforcement is required to receive this load but this raises problems, such as the weight increase of a vehicle.

SUMMARY OF THE INVENTION

An object of the present invention is, in a vehicle with a main frame and a side sill arranged side by side, to make load of a suspension arm act dispersively on the main frame and the side sill and to improve the rigidity of a vehicle body by connecting the main frame with the side sill.

In order to achieve the above object, the present invention is characterised in that it comprises a main frame extending in the longitudinal direction of a vehicle body, a side sill which is arranged outwardly of and in the widthwise direction of the main frame, extends in the longitudinal direction of the vehicle and is located between a front wheel and a rear wheel at a lower part of both sides of the vehicle body, a wheel supporting member for supporting a wheel rotatably, suspension arms connected with the wheel supporting member and a support bracket which supports swingably the suspension arm and is connected transversely with the main frame and the side sill.

In the present invention having the above construction, load from the suspension arms acts dispersively on the main frame and the side sill, both of high rigidity. Therefore, the vehicle body well stands the load and the disorder of wheel alignment can be prevented. Also, since the main frame and the side sill are connected with each other through the medium of the support bracket of the suspension arms, no special connecting means is required for them. Accordingly, no large weight increase of a vehicle is involved and a structural body of high rigidity is formed, namely, rigidity of a vehicle body is improved.

Another object of the present invention is to reduce the points of connection between suspension composing members and a vehicle body and to make the pre-regulation of wheel alignment possible.

In order to achieve the above object, the present invention is characterized in that it comprises a wheel supporting member to support a wheel rotatably and a plurality of suspension arms connected with the wheel supporting member, of which at least one is supported by a vehicle body through the medium of a support bracket and the rest is supported by a sub-frame and said support bracket is supported by the vehicle body through the medium of a support part of the sub-frame.

Under the above construction of the present invention, load from the suspension arms supported by the vehicle body through the medium of the support bracket is hardly transmitted to the sub-frame supported by the vehicle body through the medium of an elastic body and since the point of connection of the support bracket with the vehicle body and the point of support of the sub-frame are identical, it is possible to contemplate the common use of a connecting means (bolt) and to carry out positioning of the support bracket and the sub-frame beforehand.

A further object of the present invention is to provide a stopper means of simple construction for controlling displacement of the sub-frame.

In order to attain the above object, the present invention is characterized in that it comprises a wheel supporting member for supporting a wheel rotatably and a plurality of suspension arms connected with the wheel supporting member, of which at least one is supported by the vehicle body through the medium of the support bracket and the rest is supported by the sub-frame which is supported by the vehicle body through the medium of an elastic body and a stopper means provided at the support bracket for controlling displacement of the sub-frame due to the elastic body.

Under the above construction of the present invention, load from the suspension arm supported by the vehicle body through the medium of the support bracket is hardly transmitted to the sub-frame connected with the vehicle body through the medium of the elastic body and since the stopper means which controls displacement of the sub-frame is provided at the support bracket, it is unnecessary to provide a special stopper means.

The aforementioned objects and novel features of the present invention will become more apparent from the following description, taking reference to the accompanying drawings.

BRIEF DESCRIPTION OF THE DRAWINGS

The accompanying drawings show a preferred embodiment of the present invention, in which.

DESCRIPTION OF THE PREFERRED EMBODIMENT

A description is made below of a preferred embodiment of the present invention, with reference to the accompanying drawings.

Figure 1:
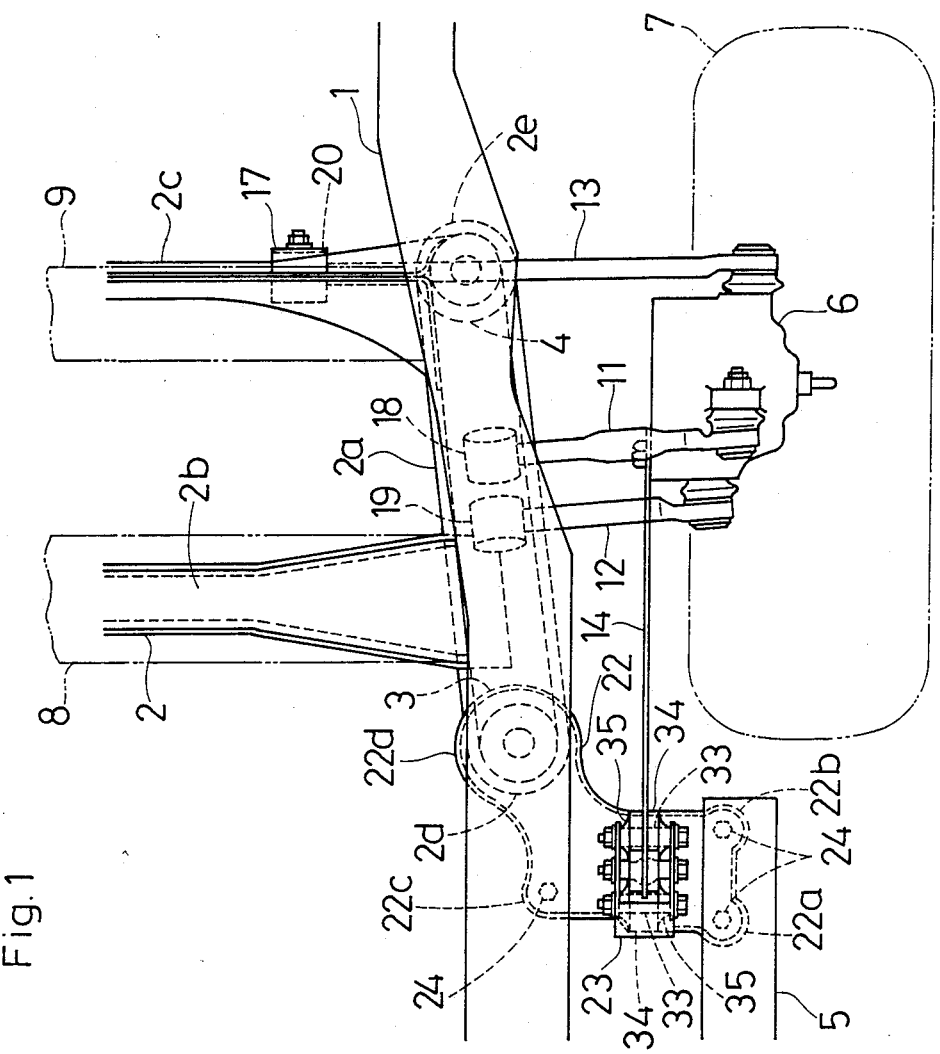
FIG. 1 is a plan view of a vehicle suspension system.

In a vehicle rear suspension system shown in FIG. 1 (plan view), reference numeral 1 designates a main frame (side frame) extending in the longitudinal direction of the side of a vehicle body. Reference numeral 2 designates a sub-frame supported by a rubber mount device 3, 4 with respect to the main frame 1 provided at the right and left sides of the vehicle body. Reference numeral 5 designates a side sill extending in the longitudinal direction at the outside of vehicle body, with a space left between it and the main frame. Reference numeral 6 designates a wheel supporting member which supports a wheel 7 rotatably. The main frames 1 at the right and left sides of the vehicle body are connected with each other by means of cross member 8, 9 extending in the widthwise direction of the vehicle body.

The sub-frame 2 comprises a vertical frame 2a extending in the longitudinal direction of the vehicle body, along the main frame 1, and a front side frame 2b and a rear side frame 2c which connect vertical frames 2a at the left and right sides of the vehicle body at the front side and the rear side. Each of the rubber mount device 3, 4 is provided at support parts 2d and 2e respectively at the front side and the rear side of the vertical frame 2a.

Figure 2:
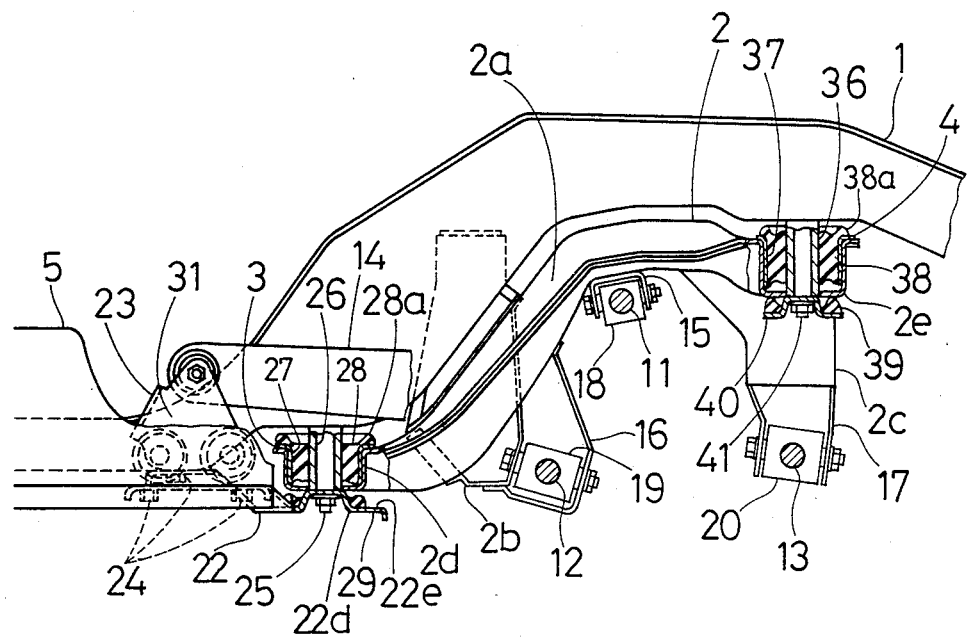
FIG. 2 is a side view, partly in section, of the system shown in FIG. 1.

Suspension arms comprise three lateral arms 11, 12, 13 and a swing arm (trailing arm) 14. Each of the lateral arms is connected, at its outer end, swingably in vertical direction with the wheel supporting member 6 and is disposed in the widthwise direction of the vehicle body. The swing arm 14 is connected, at its reat end, with the wheel supporting member 6 and is disposed in the longitudinal direction of the vehicle body. Of the three lateral arms 11, 12, 13, the first lateral arm 11 at the upper side is supported swingably in vertical direction, at its inner end, by the vertical frame 2a of the sub-frame 2 through the medium of a bracket 15 and a rubber bushing 18, as shown in FIG. 2. Similarly, the second lateral arm 12 at the lower side is supported, at its inner end, by the front lateral frame 2b of the sub-frame 2 through the medium of a bracket 16 and a rubber bushing 19 and the third rear lateral arm 13 at the lower side is supported, at its inner end, by the vertical arm 13 at the lower side is supported, at its inner end, by the vertical frame 2c of the sub-frame 2 through the medium of a bracket 17 and a rubber bushing 20.

The swing arm 14 is composed of a perpendicular flat plate and a forward end portion thereof is supported swingably by a support bracket 22 connecting the main frame 1 and the side sill 5 through the medium of a support device 23.

Figure 3:
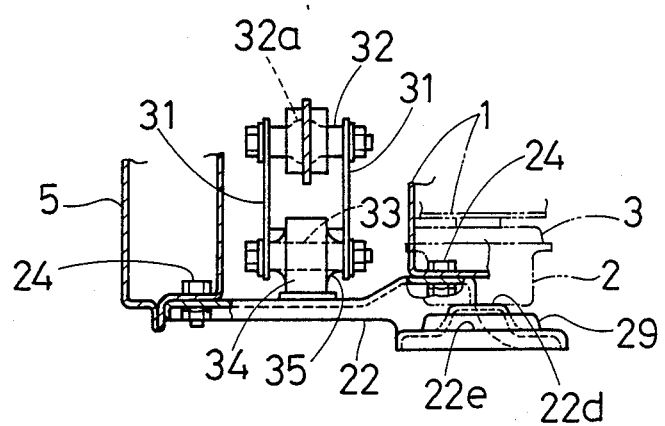
FIG. 3 is a back view, partly in section, showing the construction of a support bracket part.

The support bracket 22, as shown in FIG. 3, is composed of a plate material with its circumferential edge bent downwardly. Fixed to the central upper surface of the support bracket 22 is a support device 23. Support parts 22a, 22b at the outer side part of the support bracket 22 are connected with the underside of the side sill 5 by means of bolts 24. A support part 22c at the front of the inner side part of the support bracket 22 is connected with the underside of the main frame 1 by means of the bolt 24. Further, a support part 22d at the rear side extending rearwardly is connected with the underside of the main frame 1 by means of a mount bolt 25 through the medium of the support part 2d of the sub-frame at which the rubber mount device 3 is provided.

More particularly, by the mount bolt 25 of the rubber mount device 3 which supports elastically the sub-frame 2 to the main frame 1, the rear support part 22d at the inside of the support bracket 22 is connected with the underside of the main frame 1, together with an inner tube 26 of the rubber mount device 3.

In the rubber mount device 3, a rubber 28 is interposed between an outer tube 27 fixed to the vertical frame 2a of the sub-frame 2 and the inner tube 26. Formed at the upper surface part of the rubber 28 is an upper rubber stopper 28a which, when the sub-frame 2 moves upwardly, makes contact with the lower surface of the main frame 1 to control displacement of the sub-frame 2. The rear support part 22d at the inside of the support bracket 22 has a stopper part 22e which is bent downwardly at the circumferential part of its connection by the mount bolt 25. Fixed to the upper surface of the stopper 22e is a lower rubber stopper 29 which, when the sub-frame 2 moves downwardly, makes contact with the lower surface of the sub-frame 2 to control displacement of the sub-frame 2.

The support device 23 of the swing arm 14 carries two triangular support plates 31 which are in parallel with the swing arm 14. A support rod 32 is fitted to the upper part of both support plates 31 and the swing arm 14 is fitted to the central part of the support rod 32 through the medium of a ball joint part 32a, whereby the swing arm 14 is slidably vertically with respect to the support bracket 22 and is inclinable in the widthwise direction of the vehicle body. Two support rods 33 laid between the lower parts of the two support plates 31 are supported by outer tubes 34 through the medium of rubbers 35. Similarly to the front rubber mount device 3, inserted in the rubber mount device 4 provided at a rear support part 2e of the vertical frame 2a of the sub-frame 2 is a rubber 38 having an upper rubber stopper 38a between an inner tube 36 and an outer tube 37. A stopper member 40 to which a lower rubber stopper 39 is connected, together with the inner tube 36, to the main frame by means of a mount bolt 41.

In the above-mentioned suspension system, longitudinal force from the wheel 7 generated mostly at acceleration and deceleration of a vehicle and turning force (torque) of the wheel supporting member 6 are allotted to the swing arm 14 and the load of the swing arm 14 acts dispersively on the main frame 1 and the side sill 5 through the medium of the support device 23 and the support bracket 22. Accordingly, smaller load works on the main frame 1, in other wards, the main frame 1 can receive such load accurately, free from deformation, such as bending, and vibration. Moreover, because of the existence of the rubber mount devices 3, 4, the sub-frame 2 is almost free from the influence by such load and as a result, control on wheels is stabilized.

Since the main frame 1 and the side sill 5 are connected with each other by means of the support bracket 22, both from a rigid structural body through which load is transmitted to each other via the support bracket 22. Furthermore, since both are connected with each other by utilizing the support bracket 22 of the swing arm 14, this connection does not involve a large increase of weight and therefore rigidity of the vehicle body as a whole can be improved by simple composition.

As the rear support part 22d at the inside of the support bracket 22 and the inner tube 26 of the rubber mount device 3 use commonly the mount bolt 25 in relation to the main frame 1, this common use can realize reduction in the number of parts, simplification of construction and lighter weight of the vehicle. Also, it is made easy to use the rear support part 22d as a stopper for the rubber mount device 3.

In the case of the above-mentioned suspension system, since the rear support part 22d at the inside of the support bracket 22 and the front support part 2d of the sub-frame 2 can be connected to or supported on the main frame 1 by only one mount bolt 25, the number of bolts can be reduced, with the result of simplification of construction, improvement of assembling efficiency and lighter weight of a vehicle. The position of the support bracket 22 with respect to the sub-frame 2 can be determined beforehand due to its welding to the inner tube 26 of the rubber mount device 3. This makes it possible to regulate the wheel alignment beforehand and to set the sub-frame 2 and the support bracket 22 to the main frame 1 by lifting both together, in other wards, mountability of the suspension system on the vehicle body is improved. In addition, since the stopper part 22e which controls downward replacement of the sub-frame 2 can be formed on the support bracket 22, it is not required to provide a special stopper means.

In the case of the above embodiment, as the first lateral arm 11 and the second/the third lateral arms 12, 13 swing in parallel with each other, it is possible to prevent a big variation of camber to the ground. It becomes possible to carry out a camber control freely by determining properly the length of each lateral arm 11, 12, 13. Also, provision of the front second lateral arm 12 makes it possible to prevent the wheel 7 from shifting to the toe-out side at bumping.

It is a matter of course that the stopper part 22e does not necessarily required the connection by means of the mount bolt 25. The stopper part 22e may only be supported on the vehicle body so that it can receive load at downward movement of the sub-frame 2.

In the above embodiment, a lower rubber stopper 29 is fixed to the stopper part 22e but may be fixed to the side of the sub-frame 2.

In the above embodiment, a suspension having a trailing arm is applied to the present invention, but it is a matter of course that the present invention is applicable to suspensions of other types, such as a leading arm type and a swing axle type.

What is claimed is:

1. In a vehicle having a vehicle body, and front and rear wheels rotatably supported on the vehicle body, a suspension system comprising:
    a main frame connected to the vehicle body and extending longitudinally of the vehicle body;
    a side sill connected to the vehicle body, disposed at a lower part of the side of the vehicle body between the front and rear wheels of the vehicle body, located outwardly of said main frame with respect to the widthwise direction of the vehicle body, and extending longitudinally of the vehicle body;
    a wheel supporting member connected to the vehicle body, one of the wheels being rotatably mounted to said wheel supporting member;
    a support bracket extending transversely of and connected to said main frame and said side sill; and
    a swing arm extending longitudinally of the vehicle body, having first and second end portions, pivotally supported by said support bracket at said first end portion and connected to said wheel supporting member at said second end portion.

2. A vehicle suspension system as defined in claim 1, wherein said support bracket is connected to said side sill at an end portion of the side sill.

3. A vehicle suspension system as defined in claim 2, wherein said support bracket is fixed to the undersurfaces of said side sill and said main frame, and said first end portion of the swing arm is supported on the upper surface of said support bracket between said side sill and said main frame.

4. A vehicle suspension system as defined in claim 3, wherein said one of the wheels is a rear wheel of the vehicle and said support bracket is connected to said side sill adjacent a rear end of the side sill.

5. A vehicle suspension system as defined in claim 4, further comprising three lateral arms connected to the vehicle body and supporting said wheel supporting member on the vehicle body, and wherein said swing arm is connected with said wheel supporting member in such a manner that it restricts movement of the wheel supporting member longitudinally of the vehicle body and restricts rotation of the wheel supporting member about an axle of the wheel mounted to the wheel supporting member.

6. A vehicle suspension system as defined in claim 5, wherein said three lateral arms are pivotally secured to said sub-frame.

7. A vehicle suspension system as defined in claim 6, wherein a resilient body is connected between said sub-frame and said main frame.

8. A vehicle suspension system as defined in claim 3, further comprising a sub-frame supported by the vehicle body, and a plurality of lateral arms connected to the vehicle body and supporting said wheel supporting member on the vehicle body, said lateral arms being pivotally secured to said sub-frame.

9. A vehicle suspension system as defined in claim 8, wherein said support bracket is supported by the vehicle body at the location at which the sub-frame is supported by the vehicle body.

10. A vehicle suspension system as defined in claim 8, wherein a resilient body is connected between said sub-frame and the vehicle body.

11. A vehicle suspension system as defined in claim 10, wherein said support bracket includes stopper means for controlling displacement of said sub-frame with respect to the vehicle body.

12. A vehicle suspension system as defined in claim 10, wherein said resilient body comprises a rubber bushing disposed between the sub-frame and the vehicle body, an inner tube disposed within said rubber bushing and having an axis extending vertically, an outer tube connected to said inner tube through said rubber bushing and fixed to said sub-frame, one end of said inner tube fixed relative to the vehicle body and the other end thereof contacting said support bracket, and a common bolt connecting said support bracket, and said inner tube to the vehicle body.

13. A vehicle suspension system as defined in claim 12, wherein a rubber stopper is provided at the upper surface of said support bracket for controlling downward displacement of said sub-frame.

14. A rear wheel suspension system for a vehicle comprising:

a main frame extending in the longitudinal direction of the vehicle;

a sub-frame extending longitudinally along said main frame and attached thereto;

a side sill extending longitudinally along said main frame between a front wheel and a rear wheel of the vehicle, said side sill being located outwardly of said main frame and laterally spaced therefrom;

a wheel supporting member for rotatably supporting a wheel;

a plurality of laterally extending suspension arms pivotally connected at opposite ends to said wheel supporting member and said sub-frame;

a transversely extending support bracket connected at one end to said main frame and at an opposite end to said side sill; and a swing arm connected at a forward end to said support bracket and at a rearward end to said wheel supporting member, said swing arm extending longitudinally between said main frame and said side sill for pivotally supporting said wheel supporting member relative to said support bracket.

* * * * *